United States Patent
Maeda et al.

(10) Patent No.: US 10,167,014 B2
(45) Date of Patent: Jan. 1, 2019

(54) ACTUATOR CONTROL DEVICE

(71) Applicant: JTEKT CORPORATION, Osaka-shi, Osaka (JP)

(72) Inventors: Shingo Maeda, Okazaki (JP); Takahiro Toko, Takahama (JP); Gempei Nakasone, Nisshin (JP); Shinya Aono, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/661,333

(22) Filed: Jul. 27, 2017

(65) Prior Publication Data
US 2018/0037256 A1 Feb. 8, 2018

(30) Foreign Application Priority Data
Aug. 8, 2016 (JP) ................. 2016-155634

(51) Int. Cl.
*B62D 6/00* (2006.01)
*B62D 15/02* (2006.01)
(Continued)

(52) U.S. Cl.
CPC ............ *B62D 6/008* (2013.01); *B62D 1/286* (2013.01); *B62D 15/021* (2013.01);
(Continued)

(58) Field of Classification Search
CPC ..... B60W 10/20; B62D 1/286; B62D 5/0463; B62D 5/0412; B62D 6/008; B62D 15/021; B62D 15/025
See application file for complete search history.

(56) References Cited

U.S. PATENT DOCUMENTS 6,178,365 B1 * 1/2001 Kawagoe ............... B62D 1/286
180/167
6,212,453 B1 * 4/2001 Kawagoe ............. B62D 5/0463
180/443
(Continued)

FOREIGN PATENT DOCUMENTS

DE 199 43 410 A1 5/2000
JP 2009-214680 A 9/2009
(Continued)

OTHER PUBLICATIONS

Dec. 15, 2017 Search Report issued in European Patent Application No. 17184034.1.

*Primary Examiner* — Thomas G Black
*Assistant Examiner* — Ce Li Li
(74) *Attorney, Agent, or Firm* — Oliff PLC

(57) ABSTRACT

The actuator control device includes an assist control circuit for calculating a first assist component and an automatic steering control circuit for calculating a second assist component. The automatic steering control circuit is allowed to calculate the second assist component while a steering torque is less than a first threshold value. The automatic steering control circuit calculates the second assist component by performing PID control that uses an integral term obtained on the basis of an angle deviation. When the steering torque is less than the first threshold value but not less than a second threshold value, the automatic steering control circuit limits the integral term in such a manner that it is harder for the integral term to increase while the steering torque is not less than the second threshold value than while the steering torque is less than the second threshold value.

5 Claims, 6 Drawing Sheets

(51) Int. Cl.
*B62D 1/28* (2006.01)
*B62D 5/04* (2006.01)
(52) U.S. Cl.
CPC .......... *B62D 15/025* (2013.01); *B62D 5/0412* (2013.01); *B62D 5/0463* (2013.01)

(56) References Cited

U.S. PATENT DOCUMENTS

| | | | | |
|---|---|---|---|---|
| 6,401,019 | B2 * | 6/2002 | Ikemoto | B62D 5/0472 180/204 |
| 2015/0344066 | A1 * | 12/2015 | Tsubaki | B62D 1/286 701/41 |
| 2015/0353125 | A1 * | 12/2015 | Tsubaki | B62D 1/286 701/42 |

FOREIGN PATENT DOCUMENTS

| | | | |
|---|---|---|---|
| JP | 2015-033942 A | | 2/2015 |
| JP | 2015033942 A | * | 2/2015 |

* cited by examiner

ACTUATOR CONTROL DEVICE

INCORPORATION BY REFERENCE

The disclosure of Japanese Patent Application No. 2016-155634 filed on Aug. 8, 2016 including the specification, drawings and abstract, is incorporated herein by reference in its entirety.

BACKGROUND OF THE INVENTION

1. Field of the Invention

The invention relates to an actuator control device.

2. Description of Related Art

Some vehicle steering systems include an actuator control device that controls an actuator having a motor or the like in such a manner that the actuator generates a force for steering steered wheels of a vehicle, thus establishing a lane departure prevention assist system that prevents the vehicle from departing a lane while the vehicle travels (refer to, for example, Japanese Patent Application Publication No. 2009-214680 (JP 2009-214680 A)).

JP 2009-214680 A discloses that control for the lane departure prevention assist system that is being performed is stopped in accordance with a steering state indicating how a user holds a steering wheel to operate the steering wheel. The steering state is detected by monitoring a steering torque exerted by a user on the steering wheel. If the steering torque is not less than a cancel determination threshold value, the control for the lane departure prevention assist system is stopped so that a user (a driver) can steer the steered wheels independently.

The actuator control device calculates an assist component and controls the actuator on the basis of the assist component. The assist component is a value of electric current supplied to the actuator and is a target value of a force (an assist torque) that the actuator is required to generate.

For example, according to JP 2009-214680 A, the assist component is calculated through feedback control that is performed in such a manner as to eliminate a deviation (the amount of difference) between a target travel line and the actual position of a vehicle relative to a lane where the vehicle travels. The target travel line is set, on the basis of image data captured by a camera or the like, to allow the vehicle to keep in the lane where the vehicle travels. In this feedback control, from the standpoint of control stability, it is common to employ PID control that uses three terms: the P-term (the proportional term), the I-term (the integral term), and the D-term (the derivative term).

Assuming that the PID control is employed in JP 2009-214680 A, if the steering torque exerted by a user on the steering wheel during performance of the control for the lane departure prevention assist system is insufficient to stop the control, the steering torque acts as a resistive force. As a result, the deviation remains in a steady state. The steady-state deviation is accumulated as the I-term of the PID control in each feedback cycle. Consequently, the assist component is affected such that, as the number of times the I-term is accumulated increases, a calculated value of the assist component becomes larger.

If the steering torque exerted by a user decreases to a small value, such as a zero value, with the assist component affected in a manner described above because the steering torque is insufficient to stop the control, the actuator may be controlled in such a manner as to cause a large change in a force that steers the steered wheels of the vehicle, i.e., in such a manner as to cause a large change in a steered angle of the steered wheels.

SUMMARY OF THE INVENTION

A purpose of the invention is to provide an actuator control device for making it less likely that a large change occurs in a steered angle of a steered wheel of a vehicle.

An aspect of the invention provides an actuator control device including: a control circuit for controlling an actuator by using at least one of a first assist component and a second assist component such that the actuator generates a force that causes a steering operation mechanism of a vehicle to steer a steered wheel, the first assist component being calculated on the basis of an operational state amount changing in accordance with an operation applied by a user to the steering operation mechanism, the second assist component being calculated on the basis of an environment surrounding the vehicle, wherein the control circuit is allowed to calculate the first assist component while the operational state amount is not less than a first threshold value, and is allowed to calculate the second assist component while the operational state amount is less than the first threshold value, and the control circuit calculates the second assist component by performing feedback control that uses a control term including at least an integral term that is obtained on the basis of a deviation between target and actual values of a directional state amount that is a component indicative of a direction of travel of the vehicle. The target value of the directional state amount is set on the basis of the environment surrounding the vehicle. When the operational state amount is less than the first threshold value but not less than a second threshold value that is less than the first threshold value, the control circuit performs a limitation process that limits the control term used in the feedback control in such a manner that it is harder for the control term to increase while the operational state amount is not less than the second threshold value than while the operational state amount is less than the second threshold value.

According to this structure, while the operational state amount changing in accordance with the operation by a user is less than the first threshold value, the second assist component to be calculated on the basis of the environment surrounding the vehicle is calculated through the feedback control that is performed on the basis of the deviation between the target and actual values of the directional state amount of the vehicle. As already described in the "Description of the Related Art" section, if the operational state amount becomes not less than the second threshold value due to the operation by a user, the deviation between the target and actual values of the directional state amount may remain in a steady state, so that an element based on the deviation may get accumulated as the integral term in each feedback cycle.

However, according to this structure, when the second assist component is calculated under a condition where the deviation may remain in a steady state, the limitation process limits the control term used in the feedback control in such a manner that it is harder for the control term to increase. Accordingly, the second assist component is limited and calculated such that it is hard for the second assist component to increase, compared to while the operational state amount is less than the second threshold value. Thus, this structure makes it possible to control the actuator, while the operational state amount is less than the first threshold value, regardless of the operational state amount, in such a manner that a large change is less likely to occur in the force that steers the steered wheel of the vehicle, i.e., in such a manner that a large change is less likely to occur in a steered angle of the steered wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
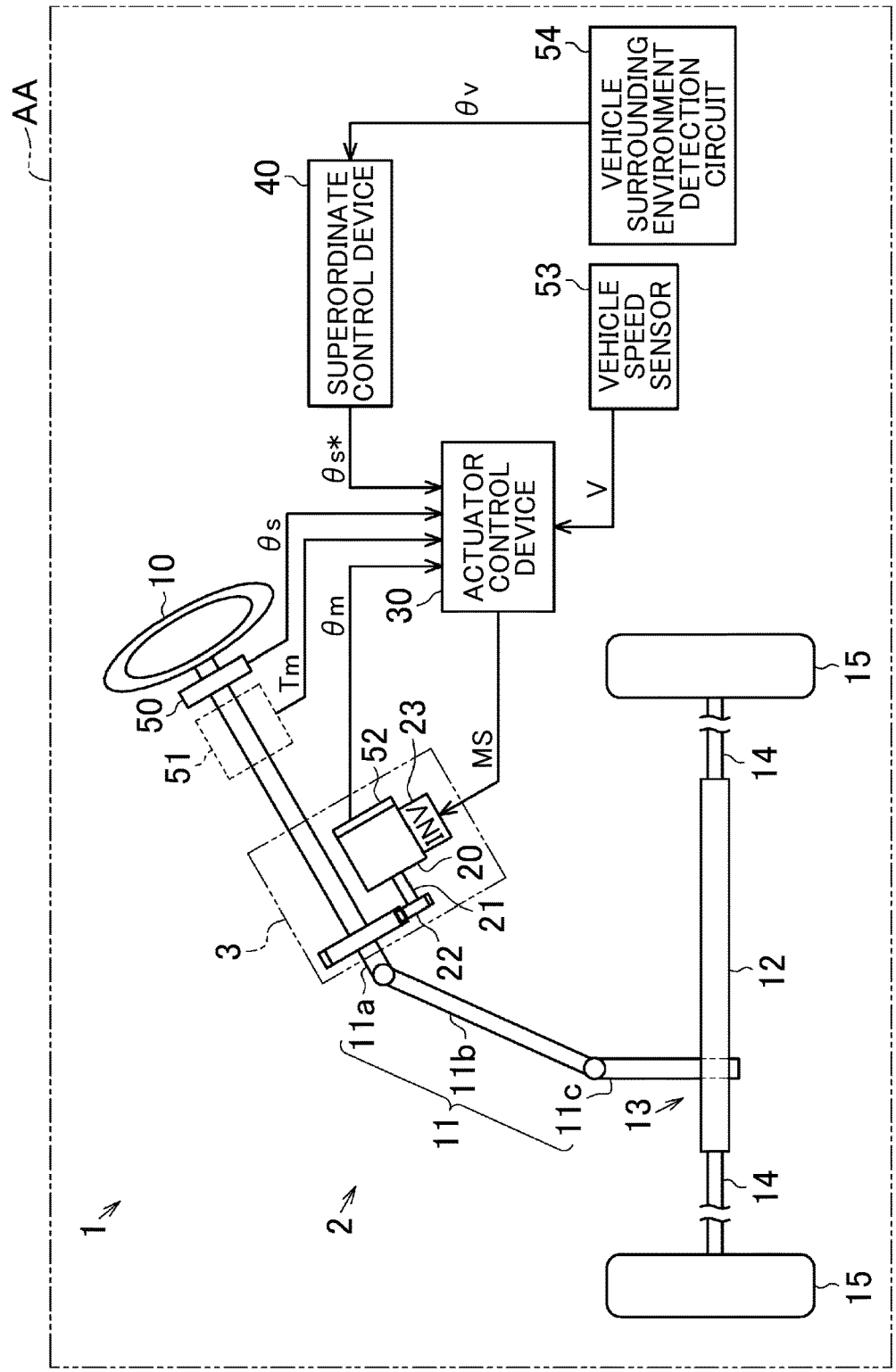
FIG. 1 is a schematic diagram illustrating a vehicle steering system.

An actuator control device according to an embodiment of the invention is described below. As illustrated in FIG. 1, a vehicle AA is provided with a vehicle steering system 1 that establishes a lane departure prevention assist system that supplies a later-described steering operation mechanism 2 with a force for automatically changing the direction of travel of the vehicle AA, thereby preventing the vehicle AA from departing from a lane while the vehicle AA travels.

The steering operation mechanism 2 includes a steering wheel 10 operated by a user and a steering shaft 11 fixed to the steering wheel 10. The steering shaft 11 includes a column shaft 11a coupled to the steering wheel 10, an intermediate shaft 11b coupled to the lower end of the column shaft 11a, and a pinion shaft 11c coupled to the lower end of the intermediate shaft 11b. The lower end of the pinion shaft 11c is coupled to a rack shaft 12 via a rack and pinion mechanism 13. The rack and pinion mechanism 13 converts rotary motion of the steering shaft 11 into axial reciprocating linear motion of the rack shaft 12. This reciprocating linear motion is transferred to right and left steered wheels 15 via tie rods 14 each coupled to a different end of the rack shaft 12. Accordingly, a steered angle of the steered wheels 15 changes.

An actuator 3 having a motor 20 serving as a source for generating the force supplied to the steering operation mechanism 2 is provided somewhere between the ends of the column shaft 11a fixed to the steering wheel 10. For example, the motor 20 is a surface permanent magnet synchronous motor (SPMSM) as a three-phase brushless motor rotating in accordance with three-phase (U, V, W) driving electric power. A rotating shaft 21 of the motor 20 is coupled to the column shaft 11a via a speed reducer 22. The actuator 3 transfers the rotational force of the rotating shaft 21 of the motor 20 to the column shaft 11a via the speed reducer 22. The torque (the rotational force) of the motor 20 supplied to the column shaft 11a serves as a force (a steering force) for changing the steered angle of the right and left steered wheels 15.

The actuator 3 is connected via an inverter 23 to an actuator control device 30 that controls the operation of the motor 20. For example, the inverter 23 is structured to include series circuits having three switching elements (metal-oxide-semiconductor field-effect transistors) for opening and closing paths between a positive terminal of an electric power source, such as a battery, of the vehicle AA and terminals of the motor 20, and three switching elements for opening and closing paths between a negative terminal of the electric power source and the terminals of the motor 20. The switching elements of the inverter 23 are switched on and off so that electric current for driving the motor 20 is supplied to the motor 20.

The actuator control device 30 switches the switching elements of the inverter 23 on and off in accordance with results detected by various types of sensors mounted on the vehicle AA, thereby controlling a control amount of the motor 20, namely, the amount of electric current supplied to the motor 20. For example, the various types of sensors include a steering angle sensor 50, a torque sensor 51, a rotational angle sensor 52, and a vehicle speed sensor 53. The steering angle sensor 50 and the torque sensor 51 are provided at the column shaft 11a, and the rotational angle sensor 52 is provided at the motor 20. The steering angle sensor 50 detects a steering angle θs that is a rotational angle of the column shaft 11a that rotates synchronously with a steering operation by a user. The torque sensor 51 detects a steering torque Tm that is exerted on the steering shaft 11 and changes in accordance with the steering operation by a user. The rotational angle sensor 52 detects a rotational angle θm of the rotating shaft 21 of the motor 20. The vehicle speed sensor 53 detects a vehicle speed V that is a speed at which the vehicle AA is traveling. It is noted that there is a correlation between the steering angle θs and the steered angle of the steered wheels 15. The steered angle of the steered wheels 15 is calculated by processing the steering angle θs and by multiplying the processed steering angle by a conversion factor. The steering angle θs is an angle convertible into the steered angle of the steered wheels 15. According to the embodiment, the steering torque Tm is an example of an operational state amount that changes in accordance with the steering operation by a user.

The actuator control device 30 is connected to a superordinate control device 40 that is mounted on the vehicle AA. The superordinate control device 40 commands the actuator control device 30 to perform automatic steering control (lane keeping control) that automatically changes the direction of travel of the vehicle AA.

The superordinate control device 40 outputs an angle command value θs* used in the automatic steering control to the actuator control device 30, on the basis of results detected by a global positioning system (GPS) sensor of a vehicle navigation system or other systems mounted on the vehicle AA, other sensors (a camera, a distance sensor, a yaw rate sensor, a laser sensor, etc.) mounted on the vehicle AA, and/or a vehicle surrounding environment detection circuit 54 that uses vehicle-to-roadside communication. The vehicle surrounding environment detection circuit 54 detects an environment surrounding the vehicle AA (hereinafter, sometimes referred to as "vehicle surrounding environment") from results detected by the various types of sensors and calculates angle information θv on the basis of the detected vehicle surrounding environment. For example, the angle information θv is a direction of the vehicle AA relative to a road. In this example, the angle information θv is a component (a directional state amount) indicative of the direction of travel of the vehicle AA and is the steered angle of the steered wheels 15 relative to a direction in which the vehicle AA travels straight. Therefore, the steering angle θs that is convertible into the steered angle of the steered wheels 15 is an actual value of the component indicative of the direction of travel of the vehicle AA. On the other hand, the angle command value θs* used in the automatic steering control is a target value of the component indicative of the direction of travel of the vehicle AA.

Although not illustrated in the drawings, the actuator control device 30 is connected to a selection switch. The selection switch is operated by a user and provides a command indicating whether to set an automatic steering mode where the actuator control device 30 performs the automatic steering control. While the command indicates that the automatic steering mode should be set, the actuator control device 30 performs the automatic steering control. In this case, if intervention in steering (hereinafter, refers to as "intervention operation") by a user occurs (i.e., if the steering torque Tm not less than a later-described threshold value B is detected), the actuator control device 30 stops performing the automatic steering control and performs intervention control that assists a user in steering. On the other hand, while the command does not indicate that the automatic steering mode should be set (i.e., while the command indicates that the automatic steering mode should not be set), the actuator control device 30 performs assist control that assists a user in steering, without performing the automatic steering control. In this case, the actuator control device 30 invalidates the angle command value θs* outputted by the superordinate control device 40.

Figure 2:
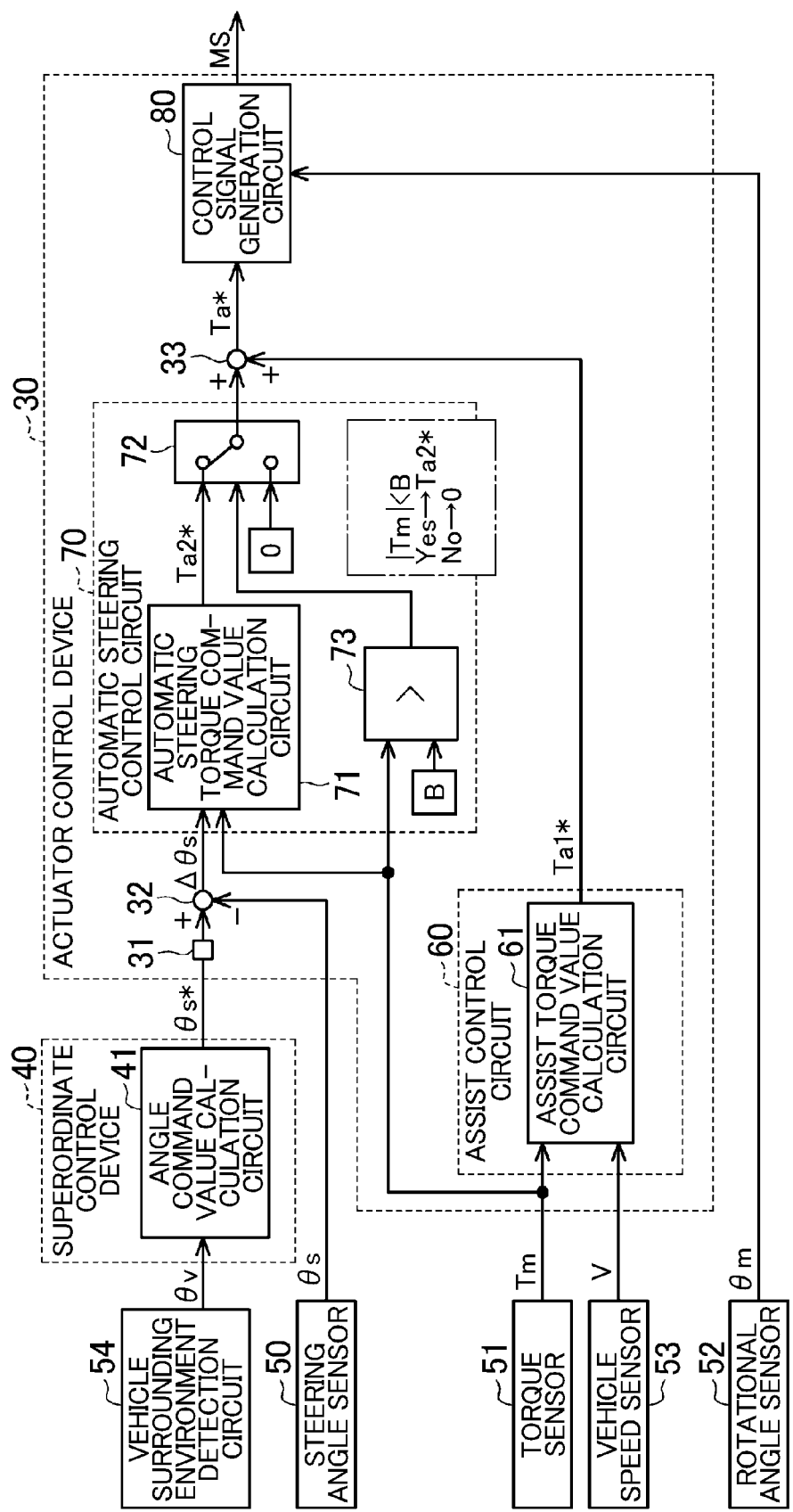
FIG. 2 is a block diagram illustrating the electrical structure of the vehicle steering system.

Next, the electrical structure of the vehicle steering system 1 and the function of the actuator control device 30 are described. As illustrated in FIG. 2, the superordinate control device 40 includes an angle command value calculation circuit 41 that calculates an optimal value of the angle command value θs* on the basis of the angle information θv. The angle command value calculation circuit 41 calculates the angle command value θs* at a predetermined periodic interval and outputs the calculated angle command value θs* to the actuator control device 30 at a predetermined periodic interval.

The actuator control device 30 includes an assist control circuit 60, an automatic steering control circuit 70, and a control signal generation circuit 80. According to the embodiment, the assist control circuit 60, the automatic steering control circuit 70, and the control signal generation circuit 80 are, for example, circuits that a microprocessing unit (MPU) having a single or multiple central processing units (CPUs) implements by executing programs stored in a memory device. Each of the assist control circuit 60, the automatic steering control circuit 70, and the control signal generation circuit 80 is an example of a control circuit according to the invention.

The assist control circuit 60 includes an assist torque command value calculation circuit 61. The assist torque command value calculation circuit 61 calculates and outputs a first assist component Ta1* on the basis of the steering torque Tm and the vehicle speed V that are respectively acquired from the torque sensor 51 and the vehicle speed sensor 53. The first assist component Ta1* is a target value of the amount of electric current corresponding to the assist torque (the force) that the motor 20 is required to generate.

The automatic steering control circuit 70 includes an automatic steering torque command value calculation circuit 71, a command value output selection circuit 72, and a command value selection determination circuit 73. The automatic steering torque command value calculation circuit 71 calculates a second assist component Ta2* on the basis of an angle deviation Δθs that is a difference between the angle command value θs* acquired from the angle command value calculation circuit 41 (the superordinate control device 40) and the steering angle θs acquired from the steering angle sensor 50. The second assist component Ta2* is a target value of the amount of electric current corresponding to an automatic steering torque (a force) that the motor 20 is required to generate.

The command value output selection circuit 72 selects whether to output the second assist component Ta2* or a zero value (zero) on the basis of the result of determination made by the command value selection determination circuit 73. On the basis of the steering torque Tm acquired from the torque sensor 51, the command value selection determination circuit 73 determines whether the absolute value of the steering torque Tm is less than a threshold value B, i.e., determines whether |Tm|<B. The threshold value B is set to an experimentally obtained value that makes it possible to determine whether the intervention operation occurs during performance of the automatic steering control.

The angle command value θs* having an upper limit and a lower limit is inputted to the automatic steering control circuit 70 via an angular velocity guard circuit 31. The angular velocity guard circuit 31 sets the upper limit and the lower limit of a present value of the angle command value θs* on the basis of the amount of change (ω) between a previous value of the angle command value θs* and the present value of the angle command value θs*. The upper limit and the lower limit of the angle command value θs* are set according to, for example, the specifications of the vehicle AA. A subtractor circuit 32 subtracts the steering angle θs from the angle command value θs* outputted by the angular velocity guard circuit 31, thus outputting an angle deviation Δθs. The angle deviation Δθs is inputted to the automatic steering torque command value calculation circuit 71.

During performance of the automatic steering control, when determining that the steering torque Tm is less than the threshold value B (|Tm|<B:Yes), i.e., when determining that no intervention operation occurs, through determination made by the command value selection determination circuit 73, the automatic steering control circuit 70 outputs the second assist component Ta2* calculated by the automatic steering torque command value calculation circuit 71 through selection made by the command value output selection circuit 72. In this case, the actuator control device 30 performs control in a non-manual control mode where mainly the automatic steering control changes the direction of travel of the vehicle AA.

On the other hand, during performance of the automatic steering control, when determining that the steering torque Tm is not less than the threshold value B (|Tm|<B:No), i.e., when determining that the intervention operation occurs, through determination made by the command value selection determination circuit 73, the automatic steering control circuit 70 outputs a zero value, regardless of what value the automatic steering torque command value calculation circuit 71 calculates, through selection made by the command value output selection circuit 72. In this case, the actuator control device 30 stops performing the automatic steering control and switches to the intervention control, thus performing control in a manual control mode where mainly the steering operation (the intervention operation) by a user changes the direction of travel of the vehicle AA.

It is noted that, during performance of the assist control, the automatic steering control circuit 70 causes the command value output selection circuit 72 to select to output a zero value, regardless of the steering torque Tm. The first assist component Ta1* outputted from the assist control circuit 60 and the second assist component Ta2* outputted from the automatic steering control circuit 70 are added together via an adder circuit 33 to produce an assist torque command value Ta* that is a final target value of the amount of electric current. The assist torque command value Ta* is inputted to the control signal generation circuit 80. The control signal generation circuit 80 generates a motor control signal MS on the basis of the assist torque command value Ta* and the rotational angle θm acquired from the rotational angle sensor 52, and outputs, to the inverter 23, the motor control signal MS as a pulse width modulation (PWM) signal.

The function of the automatic steering torque command value calculation circuit 71 of the automatic steering control circuit 70 is described in more detail below. As illustrated in FIG. 2, when receiving the angle deviation Δθs, the automatic steering torque command value calculation circuit 71 performs a combination of proportional control, integral control, and derivative control, i.e., performs PID control, thus calculating and outputting the second assist component Ta2*. Specifically, the automatic steering torque command value calculation circuit 71 calculates the second assist component Ta2* by performing feedback control on the basis of the angle deviation Δθs in such a manner that the steering angle θs follows the angle command value θs* so as to eliminate the angle deviation Δθs.

Figure 3:
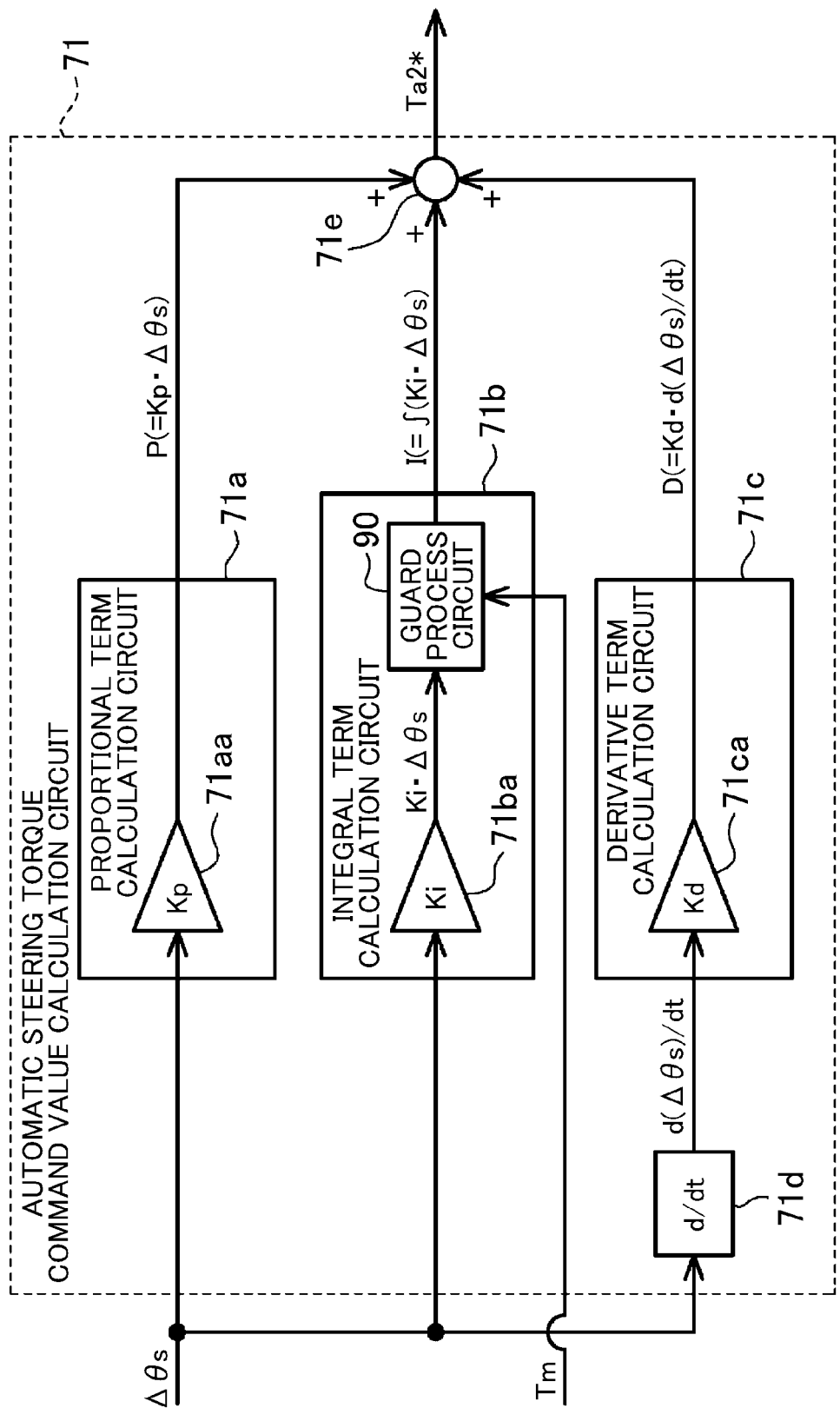
FIG. 3 is a block diagram illustrating a function of an automatic steering torque command value calculation circuit of an actuator control device.

More specifically, as illustrated in FIG. 3, the automatic steering torque command value calculation circuit 71 includes a proportional term calculation circuit 71a for calculating a proportional term P, an integral term calculation circuit 71b for calculating an integral term I, and a derivative term calculation circuit 71c for calculating a derivative term D.

The proportional term calculation circuit 71a calculates and outputs the proportional term P (=Kp·Δθs) by using a multiplier circuit 71aa that multiplies the angle deviation Δθs by a proportional gain Kp. Thus, the proportional term calculation circuit 71a performs so-called proportional control.

The integral term calculation circuit 71b calculates and outputs the integral term I(=∫(Ki·Δθs)) by using a multiplier circuit 71ba and a guard process circuit 90. The multiplier circuit 71ba calculates an integral element (Ki·Δθs) by multiplying the angle deviation Δθs by an integral gain Ki. The guard process circuit 90 calculates the integral term I(=∫(Ki·Δθs)) by accumulating the integral element (Ki·Δθs). Thus, the integral term calculation circuit 71b performs so-called integral control.

The derivative term calculation circuit 71c calculates and outputs the derivative term D(=Kd·d(Δθs)/dt) by using a derivative circuit 71d and a multiplier circuit 71ca. The derivative circuit 71d calculates a derivative element (d(Δθs)/dt) by differentiating the angle deviation Δθs with respect to time (d/dt). The multiplier circuit 71ca calculates the derivative term D (=Kd·d(Δθs)/dt) by multiplying the derivative element (d(Δθs)/dt) by a derivative gain Kd. Thus, the derivative term calculation circuit 71c performs so-called derivative control.

The proportional term P outputted from the proportional term calculation circuit 71a, the integral term I outputted from the integral term calculation circuit 71b, and the derivative term D outputted from the derivative term calculation circuit 71c are added together via an adder circuit 71e to produce a second assist component Ta2*. The second assist component Ta2* is inputted to the command value output selection circuit 72.

Figure 4:
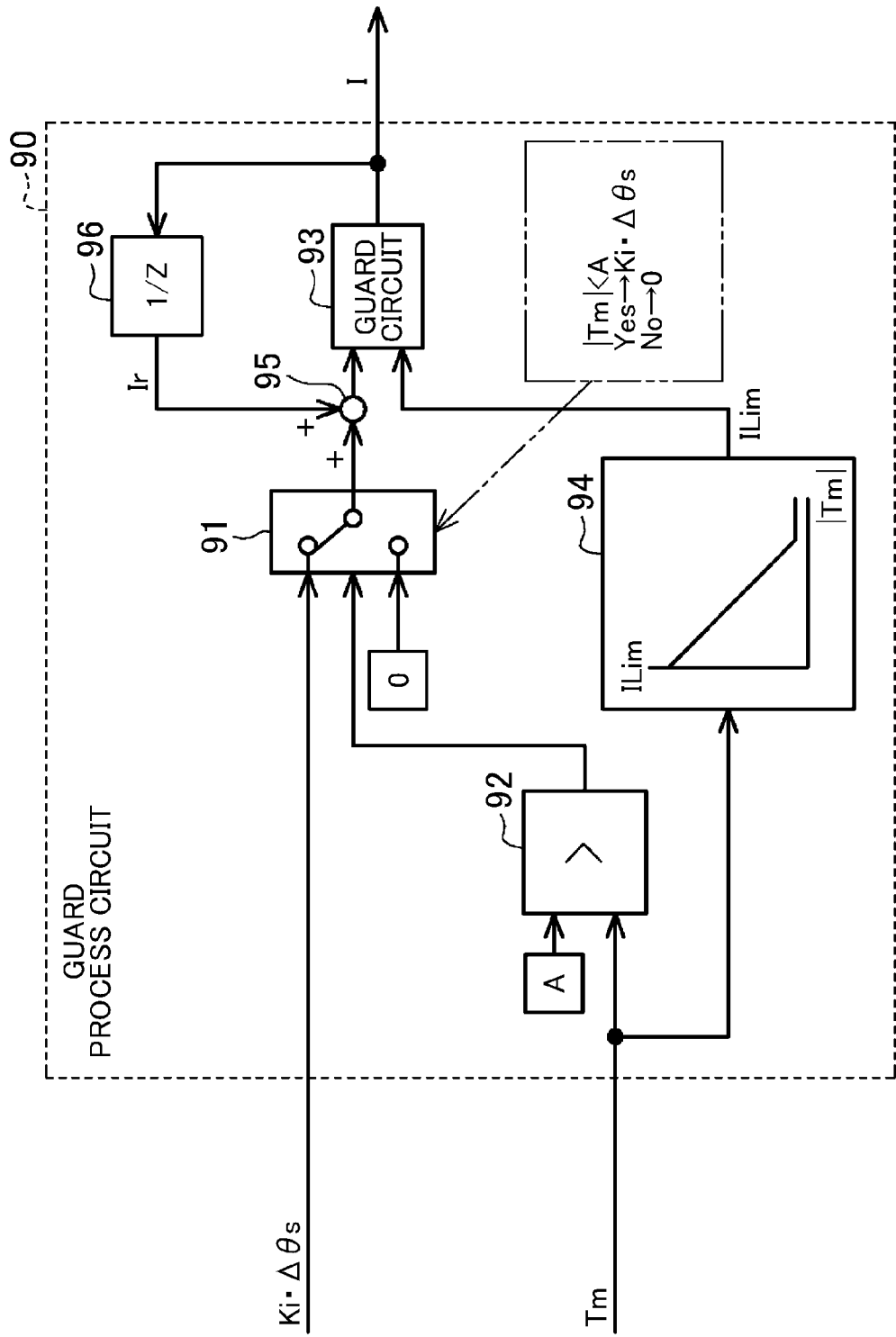
FIG. 4 is a block diagram illustrating a function of a guard process circuit of an integral term calculation circuit of the automatic steering torque command value calculation circuit.

The guard process circuit 90 is described here in detail. As illustrated in FIG. 4, the guard process circuit 90 includes an element output selection circuit 91, an element selection determination circuit 92, a guard circuit 93, and an integral term limit map calculation circuit 94.

The element output selection circuit 91 selects whether to output either the integral element (Ki·Δθs) or a zero value (zero) on the basis of the result of determination made by the element selection determination circuit 92. On the basis of the steering torque Tm acquired from the torque sensor 51, the element selection determination circuit 92 determines whether the absolute value of the steering torque Tm is less than a threshold value A, i.e., determines whether |Tm|<A. It is noted that, even when the absolute value of the steering torque Tm is not less than the threshold value A, if the absolute value of the steering torque Tm does not remain not less than the threshold value A for a threshold period C of time, the element selection determination circuit 92 determines that the absolute value of the steering torque Tm is less than the threshold value A (|Tm|<A:Yes). In contrast, if the absolute value of the steering torque Tm remains not less than the threshold value A for the threshold period C of time, the element selection determination circuit 92 determines that the absolute value of the steering torque Tm is not less than the threshold value A (|Tm|<A:No). The threshold value A is set to an experimentally obtained value that makes it possible to determine whether the intervention operation by a user occurs that is insufficient to stop the automatic steering control during performance of the automatic steering control and whether ignoring the intervention operation does not cause a large change in the steered angle of the steered wheels 15 of the vehicle AA. Specifically, the threshold value A is greater than a zero value and less than the threshold value B (0<A<B). The threshold period C of time is set to an experimentally obtained value that makes it possible to determine whether a large change in the steered angle of the steered wheels 15 of the vehicle AA may be caused when a user continues the intervention operation that is not less than the threshold value A and is insufficient to stop the automatic steering control.

The guard circuit 93 sets the upper limit of the integral term I on the basis of a guard value ILim acquired from the integral term limit map calculation circuit 94. The integral term limit map calculation circuit 94 has a map defining a relationship between the absolute value of the steering torque Tm acquired from the torque sensor 51 and the guard value ILim that the upper limit of the integral term I is set to. The integral term limit map calculation circuit 94 calculates the guard value ILim from the absolute value of the steering torque Tm as an input by using the map. As the absolute value of the steering torque Tm (|Tm|) becomes larger, the guard value ILim becomes smaller.

The integral element (Ki·Δθs) that is calculated by multiplying the angle deviation Δθs by the integral gain Ki is inputted via the multiplier circuit 71ba to the guard process circuit 90. During performance of the automatic steering control, when determining that the steering torque Tm is less than the threshold value A (|Tm|<A:Yes), i.e., when determining that the intervention operation by a user is ignorable, through determination made by the element selection determination circuit 92, the guard process circuit 90 outputs the integral element (Ki·Δθs) through selection made by the element output selection circuit 91. In this case, the automatic steering control circuit 70 determines that the intervention operation by a user is ignorable, i.e., determines that the intervention operation by a user does not cause a large change in the steered angle of the steered wheels 15 of the vehicle AA, and thus the integral term I is accumulated.

In contrast, during performance of the automatic steering control, when determining that the steering torque Tm is not less than the threshold value A (|Tm|<A: No), i.e., determining that the intervention operation by a user occurs that is insufficient to stop the automatic steering control, the guard process circuit 90 outputs a zero value, regardless of the integral element (Ki·Δθs), through selection made by the element output selection circuit 91. In this case, the automatic steering control circuit 70 determines that the intervention operation by a user occurs that is insufficient to stop the automatic steering control, i.e., determines that the intervention operation by a user may cause a large change in the steered angle of the steered wheels 15 of the vehicle AA, and thus stops accumulating the integral element (Ki·Δθs). While accumulation of the integral element (Ki·Δθs) is stopped, the integral term I remains unchanged and thus does not become greater than its present value.

It is noted that, during performance of the assist control, the guard process circuit 90 causes the element output selection circuit 91 to select to output a zero value, regardless of the steering torque Tm. The integral element (Ki·Δθs) outputted from the element output selection circuit 91 and a previous integral term Ir that has been held by a delay circuit 96 in the last cycle (in a cycle one cycle before the present cycle) are added via a adder circuit 95. These added values are inputted, to the guard circuit 93, as the integral term I that is calculated by adding the integral element (Ki·Δθs) in the present cycle to the previous integral term Ir. The guard value ILim is also inputted to the guard circuit 93 via the integral term limit map calculation circuit 94. The guard circuit 93 outputs the integral term I while the integral term I is not greater than the guard value ILim, and outputs the guard value ILim as the integral term I while the integral term I is greater than the guard value ILim.

Thus, by using the function of the guard process circuit 90, in particular, the element output selection circuit 91 and the element selection determination circuit 92, the automatic steering control circuit 70 performs a limitation process that limits the integral term I in such a manner that it is harder for the integral term I to increase while the steering torque Tm is not less than the threshold value A (|Tm|<A→No) than while the steering torque Tm is less than the threshold value A (|Tm|<A:Yes).

The embodiment described above has the following effects. (1) While the absolute value of the steering torque Tm acquired from the torque sensor 51 is less than the threshold value B, the second assist component Ta2* that is calculated on the basis of the vehicle surrounding environment (the angle information θv) inputted to the superordinate control device 40 is outputted from the command value output selection circuit 72 through the feedback control that is performed on the basis of the angle deviation Δθs. As already described in the "Description of the Related Art" section, if the intervention operation occurs that is insufficient to stop the automatic steering control, the angle deviation Δθs may remain in a steady state, so that the integral element (Ki·Δθs) may get accumulated as the integral term I in each feedback cycle.

However, as illustrated in FIG. 4, according to the embodiment, under a condition where the angle deviation Δθs may remain in a steady state, the functions of the guard process circuit 90, in particular, the element output selection circuit 91 and the element selection determination circuit 92 limit the integral term I, as a cause leading to a large change in the steered angle of the steered wheels 15, in such a manner that it is harder for the integral term I to increase. Accordingly, the second assist component Ta2* is limited and calculated such that it is hard for the second assist component Ta2* to increase, compared to while the steering torque Tm is less than the threshold value A. This makes it possible to control the motor 20 (the actuator 3), while the steering torque Tm is less than the threshold value B, regardless of the steering torque Tm, in such a manner that a large change is less likely to occur in the force that steers the steered wheels 15 of the vehicle AA, i.e., in such a manner that a large change is less likely to occur in the steered angle of the steered wheels 15.

(2) When the steering torque Tm remains less than the threshold value B but not less than the threshold value A for the threshold period C of time, it is determined that the steering torque Tm is not less than the threshold value A (|Tm|<A:No), so that the integral term calculation circuit 71*b* stops accumulating the integral term I.

The steering torque Tm remaining not less than the threshold value A for the threshold period C of time during performance of the automatic steering control indicates high probability that an intentional intervention operation by a user occurs. Thus, accumulation of the integral term I is stopped when the intentional intervention operation by a user occurs. This makes it less likely that accumulation of the integral term I is unnecessarily stopped, thereby optimizing the condition to stop accumulation of the integral term I.

(3) According to the embodiment, when controlling the actuator 3 provided at the column shaft 11*a* such that the actuator 3 generates the force that steers the steered wheels 15 of the vehicle AA, the actuator control device 30 uses the steering angle θs and the steering torque Tm that are respectively acquired from the steering angle sensor 50 and the torque sensor 51 that are each provided at the column shaft 11*a*. Further, the steering angle θs is convertible into the steered angle of the steered wheels 15. This makes it possible to generate an optimum force to steer the steered wheels 15 of the vehicle AA by controlling the actuator 3 provided at the column shaft 11*a*.

(4) Even when the steering torque Tm is less than the threshold value A, and it is determinable that the intervention operation by a user is ignorable, the steering torque Tm may decrease to a small value, such as a zero value, less than the threshold value A with the angle deviation Δθs remaining in a steady state. In this case, as already described in the "Description of the Related Art" section, the actuator 3 may be controlled in such a manner as to cause a large change in the steered angle of the steered wheels 15 of the vehicle AA.

In this regard, according to the embodiment, as illustrated in FIG. 4, while the steering torque Tm is less than the threshold value B during performance of the automatic steering control, the automatic steering control circuit 70 sets the upper limit of the integral term I in accordance with the steering torque Tm through the guard process circuit 90 (in particular, the guard circuit 93 and the integral term limit map calculation circuit 94). Further, as illustrated in FIG. 4, on the basis that the steering torque Tm is not less than the threshold value A during performance of the automatic steering control, the automatic steering control circuit 70 limits the integral element (Ki·Δθs) to be added to the previous integral term Ir to a zero value through the guard process circuit 90 (in particular, the element output selection circuit 91 and the element selection determination circuit 92).

Thus, according to the embodiment, while the steering torque Tm is less than the threshold value B during performance of the automatic steering control, the automatic steering control circuit 70 sets the upper limit of the integral term I itself, regardless of whether the steering torque Tm is not less than the threshold value A. This makes it possible to control the actuator 3, while the steering torque Tm is less than the threshold value B, in such a manner that a large change is less likely to occur in the steered angle of the steered wheels 15 of the vehicle AA, regardless of whether the steering torque Tm is not less than the threshold value A.

However, setting the upper limit of the integral term I itself in this way limits reflection of the integral term I on the feedback control that calculates the second assist component Ta2*, so that it becomes easier for the integral term I to get accumulated. This phenomenon is more noticeable while the steering torque Tm is not less than the threshold value A than while the steering torque Tm is less than the threshold value A.

In this regard, according to the embodiment, under a condition where it is easier for the integral term I to get accumulated on the basis that the steering torque Tm is not less than the threshold value A, the guard process circuit 90 (in particular, the element output selection circuit 91 and the element selection determination circuit 92) limits the integral element (Ki·Δθs) to be added to the integral term I to a zero value. Accumulation of the integral term I is stopped while the integral element (Ki·Δθs) is limited to a zero value. This makes it harder for the integral term I to get accumulated while the steering torque Tm is less than the threshold value B, thereby making it possible to control the actuator 3 in such a manner that a large change is less likely to occur in the steered angle of the steered wheels 15.

The embodiment described above can be modified in various ways. Examples of modifications are described below. The element output selection circuit 91 can adjust the integral element (Ki·Δθs) in any manner so as to make it harder for the integral term I to get accumulated. For example, instead of a zero value, the element output selection circuit 91 may output a value smaller than the integral element (Ki·Δθs) in the present cycle, such as a half value of the integral element (Ki·Δθs) in the present cycle, or may output a value that causes the integral term I to decrease. Even in such cases, the element output selection circuit 91 have the effect of limiting the integral term I in such a manner that it is harder for the integral term I to increase.

In the guard process circuit 90, like the functions of the element output selection circuit 91 and the element selection determination circuit 92, the functions of the guard circuit 93 and the integral term limit map calculation circuit 94 may be activated when the steering torque Tm is not less than the threshold value A. In the guard process circuit 90, the functions of the guard circuit 93 and the integral term limit map calculation circuit 94 may be eliminated.

The functions of the guard circuit 93 and the integral term limit map calculation circuit 94 may be used to limit the integral term I in such a manner that it is harder for the integral term I to increase. This approach eliminates the need for the functions of the element output selection circuit 91 and the element selection determination circuit 92. In this case, the integral term limit map calculation circuit 94 has a map that defines a relationship between the absolute value of the steering torque Tm and the guard value ILim, for example, such that the upper limit of the integral term I is set when the steering torque Tm is not less than the threshold value A. The structure according to this modification is applicable to the proportional term P and the derivative term D in the same manner as to the integral term I.

Limiting the integral term I in such a manner that it is harder for the integral term I to increase may be archived by setting the upper limit of the integral gain Ki. This can be achieved, for example, by adding a structure that provides the integral term calculation circuit 71b with a command indicative of the integral gain Ki. In this case, the guard process circuit 90 is required to include a structure necessary, at least, for integration of the integral element (Ki·Δθs), and thus, for example, the functions of the element output selection circuit 91 and the element selection determination circuit 92 may be eliminated. The structure that provides the integral term calculation circuit 71b with the command indicative of the integral gain Ki may, for example, have a map defining a relationship between the absolute value of the steering torque Tm and the integral gain Ki and calculate the integral gain Ki from the absolute value of the steering torque Tm as an input by using the map. For example, the upper limit of the integral gain Ki may be set when the steering torque Tm is not less than the threshold value A.

Figure 5:
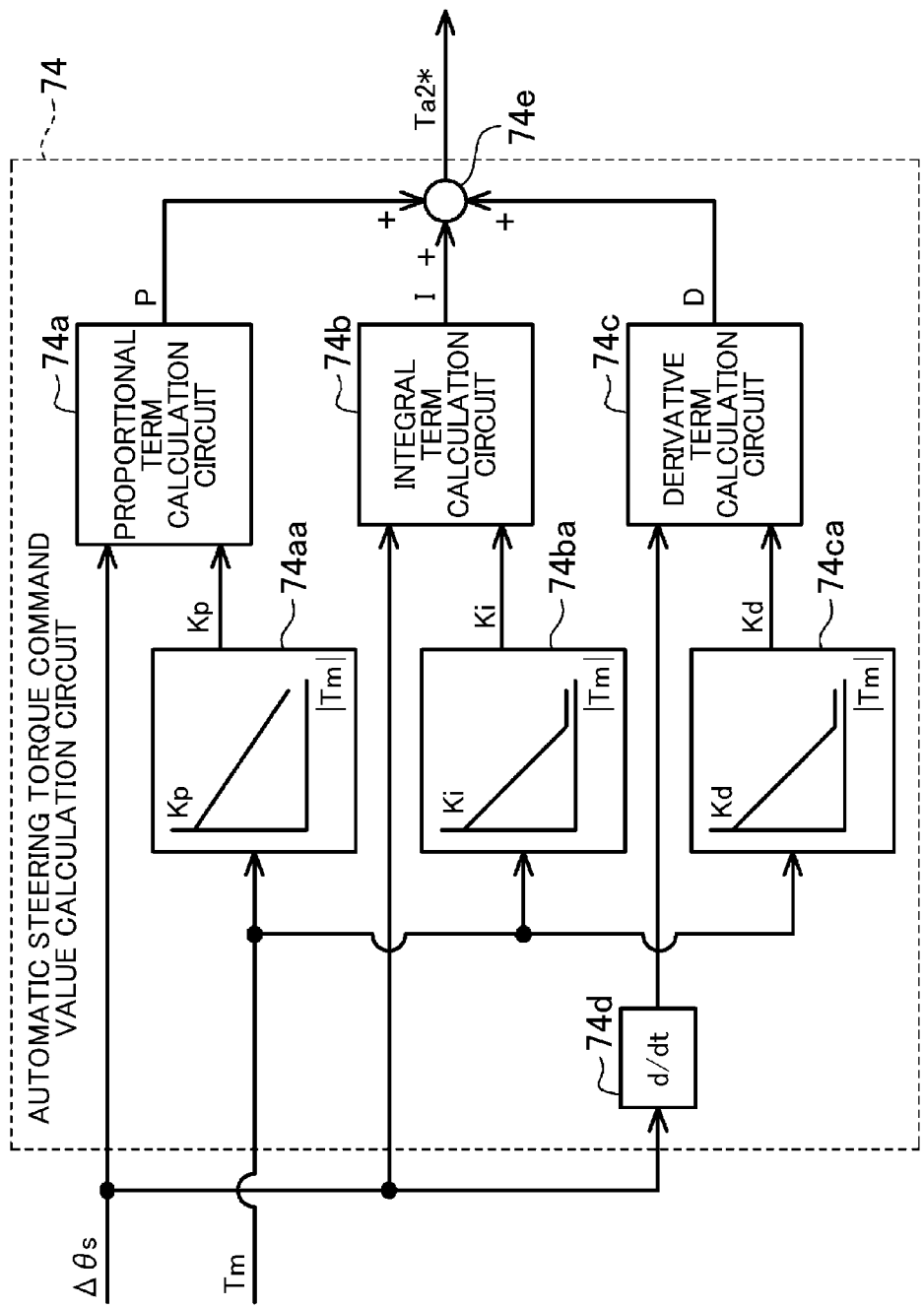
FIG. 5 is a block diagram illustrating a function of an automatic steering torque command value calculation circuit according to a modification.

As illustrated in FIG. 5, the structure according to this modification is applicable to the proportional term P and the derivative term D in the same manner as to the integral term I. An automatic steering torque command value calculation circuit 74 according to this modification includes the following circuits: a proportional gain map calculation circuit 74aa that provides a proportional term calculation circuit 74a with a command indicative of the proportional gain Kp; an integral gain map calculation circuit 74ba that provides an integral term calculation circuit 74b with a command indicative of the integral gain Ki; and a derivative gain map calculation circuit 74ca that provides a derivative term calculation circuit 74c with a command indicative of the derivative gain Kd. It is noted that a derivative element (d(Δθs)/dt) outputted from a derivative circuit 74d that differentiates the angle deviation Δθs with respect to time (d/dt) is inputted to the derivative term calculation circuit 74c. The proportional term P outputted from the proportional term calculation circuit 74a, the integral term I outputted from the integral term calculation circuit 74b, and the derivative term D outputted from the derivative term calculation circuit 74c are added together via an adder circuit 74e to produce a second assist component Ta2*. The second assist component Ta2* is inputted to the command value output selection circuit 72.

Each of the gain map calculation circuits 74aa, 74ba, and 74ca has a map defining a relationship between the absolute value of the steering torque Tm and their respective gain and calculates the gain from the absolute value of the steering torque Tm as an input by using the map. For example, the upper limits of the gains Kp, Ki, and Kd may be set when the steering torque Tm is not less than the threshold value A. In this case, setting the upper limit of the gain may be applied to at least one of the proportional term P, the integral term I, and the derivative term D. Specifically, any of the following are possible: only the upper limit of the proportional term P (the proportional gain Kp) is set; the upper limits of the proportional term P (the proportional gain Kp) and the integral term I (the integral gain Ki) are set; the upper limits of the proportional term P (the proportional gain Kp) and the derivative term D (the derivative gain Kd) are set; the upper limits of the integral term I (the integral gain Ki) and the derivative term D (the derivative gain Kd) are set; and only the upper limit of the derivative term D (the derivative gain Kd) is set. In the case that the upper limit of the integral term I and the upper limit of one of the proportional term P and derivative term D are set, the structure described in the embodiment may be used to set the upper limit of the integral term I.

Figure 6:
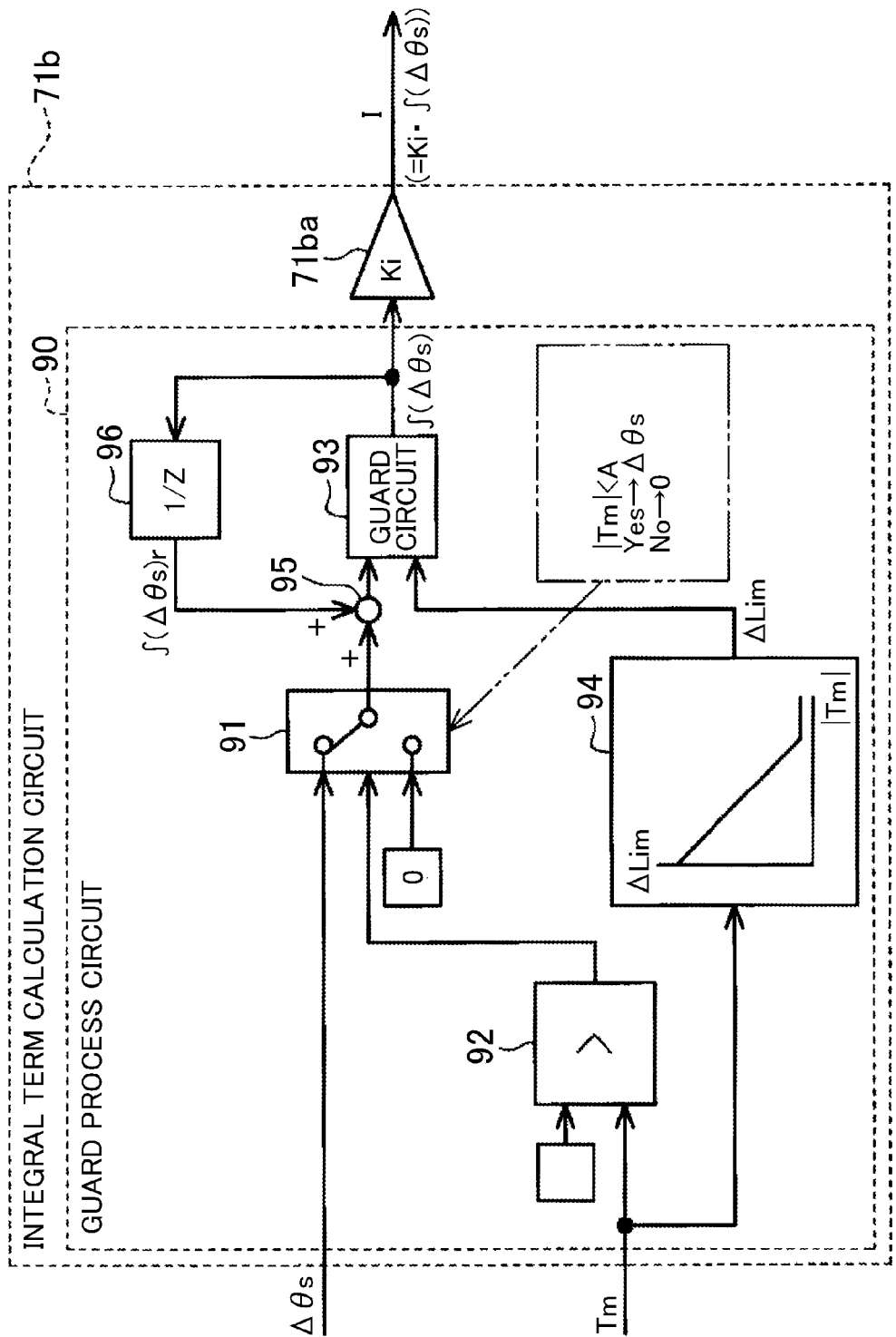
FIG. 6 is a block diagram illustrating a function of a guard process circuit of an integral term calculation circuit according to another modification.

As illustrated in FIG. 6, the integral term calculation circuit 71b may calculate the integral term I such that the angle deviation Δθs is accumulated before being multiplied by the integral gain Ki. In this case, the angle deviation Δθs is inputted to the element output selection circuit 91 of the guard process circuit 90. The element output selection circuit 91 outputs either the angle deviation Δθs or a zero value on the basis of the result of determination made by the element selection determination circuit 92. In this case, the integral term limit map calculation circuit 94 has a map defining a relationship between the absolute value of the steering torque Tm acquired from the torque sensor 51 and a guard value ΔLim that the upper limit of accumulation of the angle deviation Δθs is set to. The integral term limit map calculation circuit 94 calculates the guard value ΔLim from the absolute value of the steering torque Tm as an input by using the map. As the absolute value of the steering torque Tm (|Tm|) becomes larger, the guard value ΔLim becomes smaller. The angle deviation Δθs outputted from the element output selection circuit 91 and a previous integral element ∫(Δθs)r that is an accumulation value of the angle deviation Δθs held by the delay circuit 96 in the last cycle (in a cycle one cycle before the present cycle) are added via the adder circuit 95. These added values are inputted, to the guard circuit 93, as an integral element ∫(Δθs) that is calculated by adding the angle deviation Δθs in the present cycle to the previous integral element ∫(Δθs)r. The guard value ΔLim is also inputted to the guard circuit 93 via the integral term limit map calculation circuit 94. The guard circuit 93 outputs the integral element ∫(Δθs) while the integral element ∫(Δθs) is not greater than the guard value ΔLim, and outputs the guard value ΔLim as the integral element ∫(Δθs) while the integral element ∫(Δθs) is greater than the guard value ΔLim. The integral term calculation circuit 71b calculates and outputs the integral term I(=Ki·∫(Δθs)) via the multiplier circuit 71ba that multiples the integral element ∫(Δθs) by the integral gain Ki. This structure has effects equivalent to those described in the embodiment.

As information used to determine the state of the steering operation by a user in order to control the actuator 3, for example, angular velocity or angular acceleration of the steering angle θs may be used instead of the steering torque Tm. Alternatively, instead of the steering angle θs, a pinion angle that is an angle of the pinion shaft 11c or a position that the rack shaft 12 moves to may be used to control the actuator 3.

When the absolute value of the steering torque Tm is not less than the threshold value A, the element selection determination circuit 92 may determine that the absolute value of the steering torque Tm is not less than the threshold value A (|Tm|<A: No), regardless of how long the absolute value of the steering torque Tm remains not less than the threshold value A.

If the intervention operation occurs while the command indicates that the automatic steering mode should be set, the vehicle steering system 1 may switch from the automatic steering control to the assist control. The superordinate control device 40 may output the angle deviation Δθs, instead of the angle command value θs*, to the actuator control device 30. In this case, the superordinate control device 40 calculates the angle deviation Δθs on the basis of the steering angle θs acquired from the steering angle sensor 50.

The steering angle θs may be calculated on the basis of the rotational angle θm acquired from the rotational angle sensor 52. In this case, an absolute angle is calculated from accumulation of the rotational angle θm acquired from the rotational angle sensor 52, and the steering angle θs is calculated by multiplying the absolute angle by a conversion factor. This eliminates the need for the steering angle sensor 50, thus reducing the number and cost of parts.

At least the steering torque Tm is used to calculate the first assist component Ta1*, and thus, for example, the first assist component Ta1* may be calculated without using the vehicle speed V. Alternatively, the first assist component Ta1* may be calculated using an extra element in addition to the steering torque Tm and the vehicle speed V. At least the angle command value θs* that is calculated on the basis of the vehicle surrounding environment (the angle information θv) is used to calculate the second assist component Ta2*, and thus, for example, the second assist component Ta2* may be calculated using an extra element, such as the vehicle speed V, in addition to the angle command value θs*.

At least the steering torque Tm is used to allow the command value selection determination circuit 73 and the element selection determination circuit 92 to make their respective determinations, and thus for example, the command value selection determination circuit 73 and the element selection determination circuit 92 may make their respective determinations on the basis of an extra element, such as the steering angle θs (the angular velocity of the steering angle θs), in addition to the steering torque Tm.

The feedback control through which the second assist component Ta2* is calculated includes at least integral control, and thus, for example, the second assist component Ta2* may be calculated through PI control that uses the P-term (the proportional term) and the I-term (the integral term).

As another feature to assist a vehicle in traveling, the vehicle steering system 1 may establish a vehicle stability control system that prevents the vehicle from skidding. Alternatively, the vehicle steering system 1 may establish both the lane departure prevention assist system and the vehicle stability control system.

Although, according to the embodiment, the vehicle steering system 1 supplies the force to the column shaft 11a, the vehicle steering system 1 may supply the force to the rack shaft 12. In this case, the torque sensor 51 may be provided, for example, at the pinion shaft 11c or provided at the column shaft 11a like in the embodiment to accurately determine whether the intervention operation by a user occurs.

The embodiment is applicable to other types of steering systems, for example, steer-by-wire steering systems. In this case, the actuator 3 is provided in the vicinity of the rack shaft 12. The modifications described above can be used in combination. For example, one of the modifications that is embodied as a steer-by-wire steering system may be used in combination with any of the others of the modifications.

What is claimed is:

1. An actuator control device for controlling an actuator generating a force that causes a steering operation mechanism of a vehicle to steer a steered wheel, comprising:
    an assist control circuit configured to calculate a first assist component on a basis of an operational state amount changing in accordance with an operation applied by a user to the steering operation mechanism; and an automatic steering control circuit configured to calculate a second assist component on a basis of an environment surrounding the vehicle, wherein:

the assist control circuit is configured to calculate the first assist component while the operational state amount is equal to or more than a first threshold value, the automatic steering control circuit is configured to calculate the second assist component while the operational state amount is less than the first threshold value, the automatic steering control circuit is configured to further calculate the second assist component by performing feedback control that uses a control term including at least an integral term that is obtained by accumulating an integral element on a basis of a deviation between target and actual values of a directional state amount that is a component indicative of a direction of travel of the vehicle, the target value of the directional state amount being set on a basis of the environment surrounding the vehicle, when the operational state amount is less than the first threshold value and equal to or more than a second threshold value, the automatic steering control circuit performs a limitation process that limits the control term used in the feedback control by limiting the integral element to be added to the integral term to a zero value, such that it is harder for the control term to increase when the operational state amount is equal to or more than the second threshold value, than when the operational state amount is less than the second threshold value.

2. The actuator control device according to claim 1, wherein when the operational state amount remains less than the first threshold value and equal to or more than the second threshold value for a predetermined threshold period of time, the control circuit performs the limitation process.

3. The actuator control device according to claim 1, wherein the operational state amount is a steering torque exerted by the operation applied by the user to the steering operation mechanism, and the directional state amount is an angle convertible into a steered angle of the steered wheel.

4. The actuator control device according to claim 1, wherein the control term used in the feedback control performed by the automatic steering control circuit further includes a proportional term and a derivative term, the proportional term being obtained on a basis of the deviation between the target and actual values of the directional state amount and the derivative term being obtained on a basis of a derivative element based on the deviation.

5. The actuator control device according to claim 1, wherein while the operational state amount is less than the first threshold value, the control circuit sets an upper limit of the integral term in accordance with the operational state amount.

* * * * *